Patented Sept. 1, 1942

2,294,804

UNITED STATES PATENT OFFICE 2,294,804

EXTREME PRESSURE LUBRICANT

Vernon L. Ricketts, Martinez, Calif., assignor, by mesne assignments, to E. I. du Pont de Nemours and Company, Wilmington, Del., a corporation of Delaware No Drawing. Application June 1, 1936, Serial No. 82,927

9 Claims. (Cl. 252—53)

This invention is concerned with high pressure lubricants, and is particularly concerned with the manufacture of lubricants which permit relatively moving metallic surfaces to be loaded to a greater pressure per unit area before seizing and scoring of the bearing surface takes place than such pressures are possible when a lubricant suitable for milder conditions, e. g., a pure mineral oil, is employed.

In modern lubrication, account has to be taken of very high pressures occurring temporarily between the adjoining parts of moving metallic surfaces. Such pressures, particularly when accompanied by high speeds, give rise to high temperatures under which ordinary lubricants are no longer able to keep the moving surfaces apart. Such conditions develop, for example, in steelmill rolling necks, universal joints and especially in the use of worm and hypoid gears in automobile transmissions and differentials, but may also develop in crank shaft bearings in an internal combustion engine. It is known that in such cases ordinary lubricating films fail to keep the moving surfaces apart and therefore fail to protect the metal against contact and scoring. To remedy this, it has heretofore been proposed to separate the metallic surfaces by providing a thin layer, of the order of molecular dimensions, of chemical compounds formed on and from the metal of the relatively moving parts. It is believed that some of the substances, such, for example, as sulfur, chlorine, etc., when added to lubricating oils and subjected to high temperatures produced by the pressure on the moving parts, combine in some chemical manner with the metal of these parts, producing microscopic protective films which adhere tenaciously to metal surfaces. This prevents metal-to-metal contact when the oil film breaks under extremely high pressures and its function of lubricating metal surfaces is performed by the dense protective film formed on the metal surface.

It is an object of the present invention to provide a lubricant which will adhere to metal surfaces and prevent metal-to-metal contact at high pressures, in the absence of a true film of oil.

The lubricating composition of the present invention is particularly adapted for lubricating metallic parts which are operated under high pressures. They may, however, also be employed in situations in which lower pressures are employed. Thus, in ordinary film lubrication, well lubricated bearing loads rarely exceed 2,000 lbs. per sq. in. projected area, and the rubbing speeds are generally sufficient to maintain a film of oil which separates the rubbing surfaces, so that ordinary lubricants, suitable for mild conditions, are satisfactory. But when a machine of this type is out of operation the oil often drains out from the space between the relatively movable parts, thereby destroying the film, and trouble is often encountered when the machine is first started up. The lubricating composition of the present invention will prevent damage to the metallic parts during such starting up period, because the microscopic film is tenaceously held to the metal, and will not flow out when the machine is out of operation.

One of the essential requirements to be satisfied by the protective films which are chemically attached to the metal of the bearing surface is that their internal cohesion and, contingently, their external adhesion, be less than that of the metal underneath said films, so that when the whole or part of the protective film is swept away by small irregularities in the metal, or by friction, the metal of the surface is not abraded.

I have discovered that organic esters of phosphorous acid, when admixed to lubricants suitable for milder conditions, particularly hydrocarbon oils, are of especial utility in the field of extreme pressure lubrication. Both the neutral and the acid esters may be employed, and aryl, mixed aryl-alkyl, and alkyl esters are suitable, but I prefer to employ the alkyl esters. The aryl or alkyl radical may contain polar substituents, such as —OH, —NH$_2$, and/or halogen, such as —Cl.

The length of the carbon chain in the alkyl radical depends upon the number of esterified groups in the phosphorous acid, and is preferably chosen so as to produce a compound which is substantially non-volatile, or less volatile than the lubricant to which it is to be added, and which may be combined with a lubricant without greatly affecting its viscosity. I have found that a great number of various saturated and unsaturated, straight and branched chain alkyl radicals are useful. Thus, esters having long aliphatic chains of thirty or more carbon atoms may be employed, although esters of lower members of the aliphatic series such as ethyl or butyl phosphites, are also suitable. Specific examples are: mono-, di- and tri-ethyl, butyl, isobutyl, lauryl, cetyl, and octadecyl phosphites, as well as mixed phosphites.

These esters may be prepared by any known method. According to the procedure outlined by T. Milobendzki and A. Sachnowski in Chem. Polski 15:34–7; 1917 (Chemical Abstracts 13:2865—1919), three mols of the desired aliphatic alcohol are blended with 3 mols of pyridine ($C_5H_5N$); the resulting mixture is diluted with ethyl ether and one mol of phosphorus tri-chloride ($PCl_3$) is then added slowly to the diluted mixture, which is held at a temperature of 30 to 60° F. The precipitated pyridine hydrochlorides ($C_5H_5N.HCl$) are then filtered off, and the filtrate is distilled to separate the ether, leaving the crude phosphorous acid esters as a residue. This procedure is known to produce satisfactory esters; however, other processes may be employed, and I do not restrict the present invention to any specific mode of preparing the esters.

Acid esters may be produced by the decomposition of neutral esters, as described in the above articles. This decomposition reaction may occur before the ester is added to the oil or may occur during service.

These esters may be added to other lubricants, such as petroleum mineral oils, in relatively small amounts, ranging from a few tenths of one per cent to five or even as high as 25 per cent. They are suitable with a great variety of metals, such as ferrous alloys, bronze or copper alloys, cadmium-silver alloys, etc.

It is not necessary that these esters be obtained in an extremely pure condition to be effective as extreme pressure lubricants, although the pure esters would be satisfactory lubricants.

To further illustrate the use of these esters, the following examples are presented. 5% by volume of the esters named in the following table were blended with a Mid-Continent steam refined cylinder stock having a viscosity of 180 Sec. Say. Univ. at 210° F. The blended oils and the original oil were tested by means of a Timken Lubricant Tester, with the results indicated below:

| Lubricant | Timken test in lbs./sq. in. | |
| --- | --- | --- |
| | Satisfactory | Failed |
| 100% Mid-Continent oil | 5,714 | 8,575 |
| 95% Mid-Continent oil+5% tri-isoamyl phosphite | 25,700 | 28,570 |
| 95% Mid-Continent oil+5% tri-butyl phosphite | 37,140 | 40,000 |
| 95% Mid-Continent oil+5% tri-ethyl phosphite | 28,570 | 31,420 |

The boiling ranges of the crude phosphorous acid esters which were used in the above examples are approximately as follows:

| | ° F. |
| --- | --- |
| Tri-isoamyl phosphite | 311 to 536 |
| Tri-butyl phosphite | 244 to 518 |
| Tri-ethyl phosphite | 212 to 392 |

These organic esters of phosphorous acid are non-corrosive with respect to copper, bronze, steel, and many other metals. When used in conjunction with mineral lubricating oils as transmission and gear lubricants, they do not cause appreciable increases in bearing or gear wear. Moreover, they do not froth objectionably and prevent scuffing of the gears.

Other ingredients may be employed in addition to the esters to increase the tenacity of the resulting lubricant and to prevent leakage from bearings or gear cases. For example, several lubricating oils containing about 5% of phosphorous acid esters could also contain aluminum stearate, soda soaps, lead soaps, or calcium soaps, without departing from the spirit and scope of the invention. Thus, these phosphites may be employed either in greases or in more liquid lubricants, such as steam refined cylinder stocks or lubricating distillates, the blends described in the above example being typical.

Other typical formulae utilizing esters of phosphorous acid are:

1. Beef tallow _____ gallons __ 60
   45° Bé. caustic soda solution _____ do ____ 13¼
   Crude esters of phosphorous acid _ do ____ 40
   1000 sec. Say. Univ. asphaltic base pale oil _____ gallons __ 200
2. Commercial aluminum stearate _____
   _____ per cent by weight __ 5
   Crude esters of phosphorous acid ____
   _____ per cent by weight __ 3
   Mid-Continent steam refined cylinder stock _____ per cent by weight __ 92

The use of these esters in lubricants makes it possible to employ lubricants which have considerably lower viscosities than was heretofore considered safe for ordinary film lubrication. Thus, oils having viscosities as low as 100 sec. Say. Univ. at 100° F. may be employed under high bearing loads, since the effect of my lubricant depends upon the formation of a microscopic film which is attached to the metal by a chemical bond, and is not dependent upon the existence of a true film of oil.

Both of the above types of mineral oils are readily miscible with the esters of phosphorous acid, and no special blending technique is necessary in preparing fluid lubricants.

I claim as my invention:

1. A lubricant for metallic bearing surfaces comprising a major proportion of a mineral lubricating oil and a minor proportion of an aliphatic ester of phosphorous acid in which each aliphatic group contains from 1 to 5 carbon atoms.

2. A lubricant for metallic bearing surfaces comprising a major proportion of a mineral lubricating oil and a minor proportion of an aliphatic ester of phosphorous acid in which each aliphatic group contains from 1 to 5 carbon atoms, and in which the aliphatic radicals are members of the group consisting of alkyl radicals, halogen substituted alkyl radicals, amino substituted alkyl radicals and hydroxy substituted alkyl radicals.

3. A lubricant for metallic bearing surfaces comprising a major proportion of a mineral lubricating oil and a minor amount of an alkyl ester of phosphorous acid, in which each alkyl radical contains from 4 to 5 carbon atoms.

4. A lubricating composition comprising a major amount of a mineral lubricating oil and a minor amout of an ethyl ester of phosphorous acid.

5. A lubricating composition comprising a major amount of a mineral lubricating oil and a minor amount of triethyl phosphite.

6. A lubricating composition comprising a major amount of a mineral lubricating oil and a minor amount of a butyl ester of phosphorous acid.

7. A lubricating composition comprising a major amount of a mineral lubricating oil and a minor amount of an amyl ester of phosphorous acid.

8. A lubricating composition comprising a major amount of a mineral lubricating oil and a minor amount of a tributyl phosphite.

9. A lubricating composition comprising a major amount of a mineral lubricating oil and a minor amount of a triamyl phosphite.

VERNON L. RICKETTS.